United States Patent

[11] 3,581,768

| [72] | Inventor | Robert F. Conti<br>Easton, Pa. |
|---|---|---|
| [21] | Appl. No. | 816,248 |
| [22] | Filed | Apr. 15, 1969 |
| [45] | Patented | June 1, 1971 |
| [73] | Assignee | Follett Corporation<br>Easton, Pa. |

[54] ICE DIVERTER VALVE
5 Claims, 8 Drawing Figs.

[52] U.S. Cl. .................................................. 137/610,
137/625.15
[51] Int. Cl. ...................................................... F16k 11/00
[50] Field of Search........................................... 137/610,
561, 625.15, 625.11; 251/75, 77, 288, 304, 307

[56]           References Cited
            UNITED STATES PATENTS
3,199,537   8/1965   Swanson........................   137/610X
3,213,873   10/1965   Cordis..........................   251/75X
3,395,731   8/1968   Kauffman.....................   137/610

*Primary Examiner*—William R. Cline
*Attorney*—F. J. Pisarra

ABSTRACT: This invention is directed to a valve for directing the flow of ice from a single inlet source to any one of two or more receivers through separate ducts. The ice is passed from the single inlet to a selected outlet through a rotary valve body having a longitudinal duct having its inlet end axially aligned with the single inlet and its discharge end radially offset for selective registry with the outlets which are disposed on the locus of a circle having the same radius as that of the duct offset. Power means are provided to initiate rotation of the valve body from one position to another and spring loaded toggle means are provided to complete the movement of the valve body.

INVENTOR.
ROBERT F. CONTI
BY
F. J. Pizarra
ATTORNEY

INVENTOR.
ROBERT F. CONTI
BY
F. J. Pisarra
ATTORNEY

ICE DIVERTER VALVE

THE INVENTION

This invention relates generally to new and useful improvements in material handling apparatus and particularly seeks to provide a novel valve for diverting the flow of continuously produced diced ice from a single duct source to any one of two or more receivers through separate ducts.

Heretofore, most automatic ice makers normally have deposited their output by gravity into a storage cabinet mounted therebelow. Such machines are not suitable for use where it is desirable, for space saving or other reasons, to locate the storage cabinet at a position remote from that of the icemaking machine. More recently, however, icemaking machines such as that disclosed in U.S. Pat. No. 3,371,505, have become available and have the ability to convey their output through a tubular duct to a remote storage unit.

These later types of machines continuously convey the output ice to the remote storage unit until that unit is filled, at which time a level sensing control in the storage unit turns off the icemaker. The icemaker then sits idle until enough ice has been removed to reactivate the level sensing control and restart the icemaker. Much, if not all, of this idle time could be eliminated if the ice output could be selectively diverted to two or more remotely located storage units and continuously supplied thereto until all of the storage units are full.

The economics of ice machine production also makes it desirable, in many instances, to have a single machine serve a number of remotely located storage units. For example, an installation normally requiring two 300 pound daily capacity ice machines, each with its own storage unit, at two separate locations, could be equally well serviced at a lesser cost by a single 600 pound machine equipped with means to divert the ice flow from one storage unit to the other. One 600 pound machine would only cost about 25 percent more than a single 300 pound machine and thus would effect a substantial reduction in the capital investment required.

Ice diverter valves constructed and operated in accordance with this invention are particularly adapted for use with icemakers that supply ice to two or more remotely located storage units.

Therefore, an object of this invention is to provide a diverter valve that is capable of accepting a continuous flow of dice ice from an icemaking machine and selectively diverting the flow into two or more outlet passages that are connected to an equal number of remotely located storage units.

Another object of this invention is to provide an ice diverter valve of the character stated that includes a single fixed inlet that can be selectively connected to one of two or more outlets through a duct formed in a rotatable cylindrical valve body.

Another object of this invention is to provide an ice diverter valve of the character stated in which the cylindrical valve body is rotatably mounted between two spaced parallel support plates, one of which is provided with a single inlet that is coaxial with the valve body and the other of which is provided with the desired number of outlets that are located along the locus of a circle that is concentric with the axis of the valve body.

Another object of this invention is to provide an ice diverter valve of the character stated in which the spacing between the outlet-containing support plate and the associated end of the cylindrical valve body is such that the ice flowing through one outlet will be cleanly sheared whenever the valve body is rotated to connect its duct to another outlet.

Another object of this invention is to provide an ice diverter valve of the character stated in which means are provided for accurately registering the outlet end of the valve duct with a selected outlet in the associated supporting plate each time the valve body is rotated whereby to avoid any misalignment that would create a partial obstruction to the smooth flow of ice and cause the ice to jam.

A further object of this invention is to provide an ice diverter valve of the character stated in which, for a two outlet valve, the valve body is driven by a reversible motor through sprocket, low motion coupling and toggle connections.

A further object of this invention is to provide an ice diverter valve of the character stated in which, for a multiple outlet valve, the valve body is driven in one direction by a motor and a spring loaded detent is provided to determine registry of the valve duct with a selected outlet and to stop the motor as registry is approached.

A further object of this invention is to provide an ice diverter valve of the character stated that is simple in design, rugged in construction and economical to manufacture.

With these and other objects, the nature of which will be apparent, the invention will be more fully understood by reference to the drawings, the accompanying detailed description and the appended claims.

Figure 1:
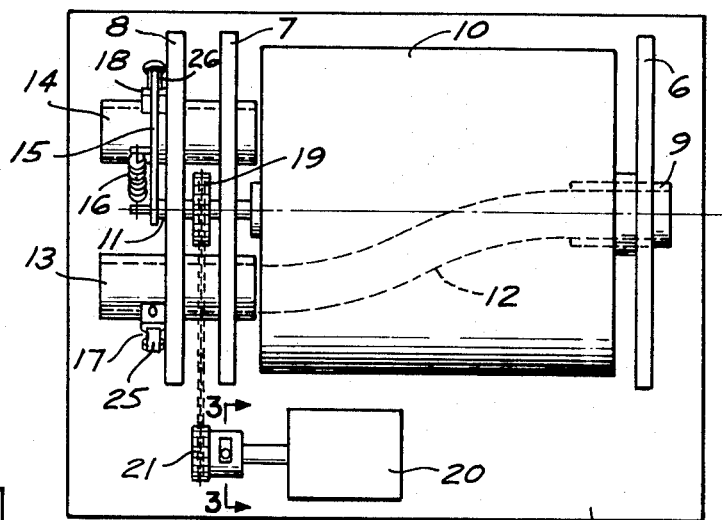
FIG. 1 is a partly schematic top plan view of a two position ice diverter valve constructed in accordance with this invention.

Referring to the drawings in detail, the invention, as illustrated, is embodied in a two-position ice diverter valve and includes a base 5 to which is rigidly affixed right and left spaced parallel vertical end plates 6 and 7. Another end plate 8 is affixed to the base 5 and is spaced a slight distance from the end plate 7 in parallelism therewith.

A fixed ice inlet tube 9 extends through the center of the end plate 6 and its inner end rotatably supports one end of a cylindrical valve body 10, the other end of which is provided with a stub shaft 11 that extends through the end plates 7 and 8 and is rotatably supported thereby.

The valve body 10 is provided with a generally longitudinal curved duct or passageway 12 of circular cross section and having its right end in registry with the ice inlet tube 9 at the axis of the valve body and its left end radially offset a substantial distance. The diameter of the duct 12 is the same as the inside diameter of the inlet tube 9.

A pair of fixed ice outlet tubes 13 and 14 extend through the lower portions of the end plates 7 and 8 and are horizontally disposed on the locus of a circle whose radius is equal to the amount of radial offset of the left end of the duct 12. The inside diameter of the tubes 13 and 14 is the same as the diameter of the duct 12 and the tubes are angularly spaced about 85° with reference to their locus circle. The right ends of the tubes 13 and 14 extend into close proximity to the associated end of the valve body 10, and their left ends extend a substantial distance beyond the end plate 8 for connection with piping to the remote storage units.

A radially extending toggle arm 15 is affixed to the free end of the shaft 11 adjacent the face of the end plate 8 and controls the oscillatory operation of the valve body 10 as will be hereinafter more fully described. A tension spring 16 has one end affixed to the toggle arm 15 and its other end affixed to the end plate 8 at a position vertically below the axis of the shaft 11.

The outlet of the duct 12 must be accurately registered with each of the outlet tubes 13 and 14 whenever the valve body 10 is oscillated from one position to the other. The toggle arm 15 determines this registry by abutting against either of two adjustable stops 17 and 18 that are affixed to and protrude from the end plate 8.

Figure 3:
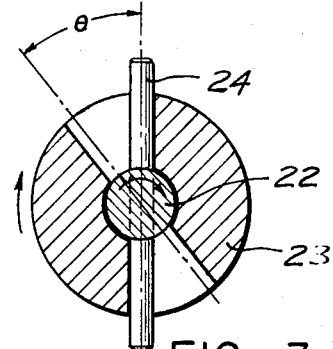
FIG. 3 is an enlarged fragmentary transverse section taken along line 3-3 of FIG. 1 and shows the details of the overrun hub of the drive sprocket.

A sprocket 19 is affixed to the valve body shaft 11 intermediate the end plates 7 and 8, and is chain driven from a reversible motor 20 provided with a driving sprocket 21 freely fitted on the motor shaft 22 and operably connected thereto through a lost-motion or overrun hub 23 (see FIG. 3) and a fixed driving pin 24 that extends transversely through the motor shaft. The angle of free relative movement between the hub 23 and the motor shaft 22 is equal to the angle through which the valve body 10 must rotate in order to move the discharge end of the duct 12 from a position in registry with one of the ice outlet tubes 13 or 14 into a position in registry with the other thereof.

Limit switches 25 and 26 are secured to the end plate 8 in proximity to the stops 17 and 18 and serve to disconnect the motor 20 each time the toggle arm 15 is flipped over into contact with either one or the other of the stops.

Figure 4:
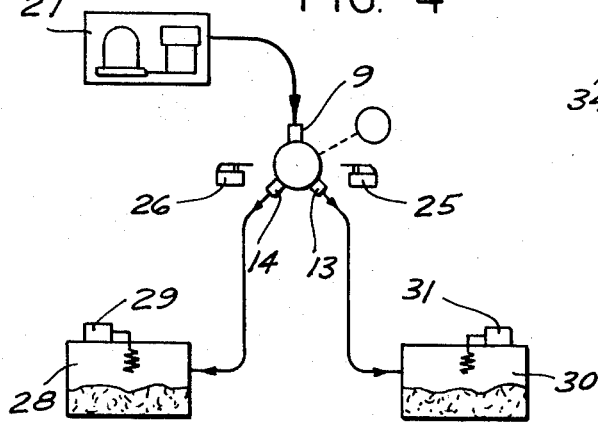
FIG. 4 is a schematic flow sheet of a typical valve installation.
Figure 7:
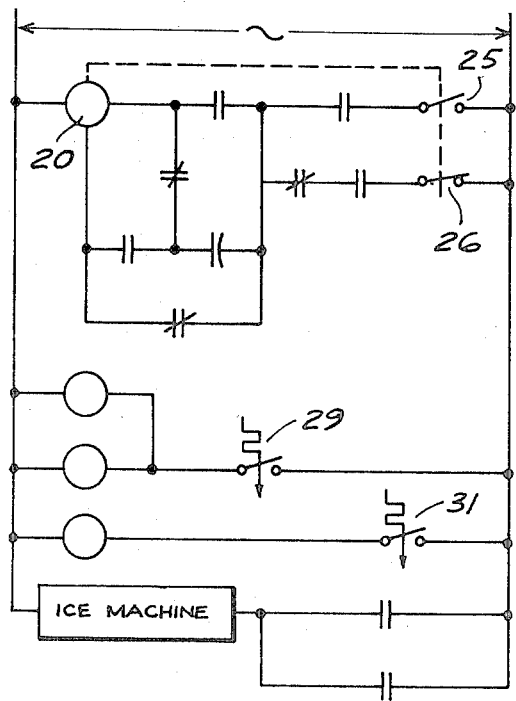
FIG. 7 is a schematic wiring diagram for a typical two-position installation.

As will be seen from FIG. 4 the schematic wiring diagram of FIG. 7, in a typical installation of this two position diverter valve, the valve receives ice from an ice making machine 27 and directs the ice either to a storage bin 28 equipped with a bin level control 29 or to a storage bin 30 equipped with a bin level control 31. FIG. 7 shows the wiring for a priority system in which the storage bin 28 has priority, the valve body 10 is in the position shown in FIGS. 1 and 2 for delivery of ice to the storage bin 30, and the ice in both storage bins has reached satisfied levels and the ice machine 27 has become shut down.

Figure 2:
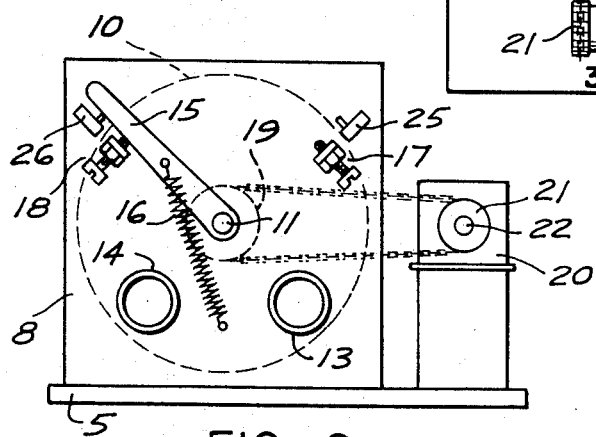
FIG. 2 is a left end elevation thereof.

When the ice level in the storage bin 28 drops sufficiently to reactivate the bin level control 29, the ice machine 27 will restart and the valve drive motor 20 will be started to rotate the valve body 10 in a clockwise direction, as viewed in FIG. 2, to divert ice from the outlet 13 to the outlet 14. The initial rotation of the valve body 10 is positive because the motor drive pin 24 is engaged against the associated portions of the hub 23 (see FIG. 3) and the relative motion between the outlet edges of the duct 12 and the outlet pipe 13 will positively shear the ice at the inner end of the pipe 13. The toggle arm 15 is also moving in a clockwise direction, and as soon as it passes its top dead center position the spring 16 flips it (and the valve body 10) rapidly to its ultimate position against the stop 17 so that the duct 12 accurately registers with the outlet 14 to delivery ice to the storage bin 28. This flipping of the toggle is permitted by the lost motion or overrun hub 23 of the drive sprocket 21 which in effect "free wheels" through the angle through which the toggle arms 15 flips. As the toggle arms reaches the stop 17, its outer end contacts the limit switch 25 to stop the motor 20.

After the storage bin 28 has been filled to the satisfaction of its level control 29, and if there is demand for ice at the storage bin 30, the reverse action of the valve body 10 takes place in the manner described above to connect the duct 12 with the outlet pipe 13. If there is no demand for ice at the storage bin 30 at the time the storage bin 28 has become filled, the entire unit will shut down until a demand arises at a storage bin.

It will be understood that the above described priority control system is considered to be merely illustrative of one of several types of systems in which the diverter valve of this invention may be usefully installed. For example, a timed control system could be used to alternately feed the storage bins in some predetermined proportion or a manual control system could be used. Obviously, the ice diverter valve per se will operate in the above described manner regardless of the type of system used to control it.

It will be further understood that the required oscillation of the valve body 10 and its associated toggle arm 15 may be effected by means other than the motor 20 and its lost motion sprocket and chain drive. Solenoids or air or hydraulic cylinders with lost motion connections to the toggle arm 15 would serve equally well.

Figure 5:
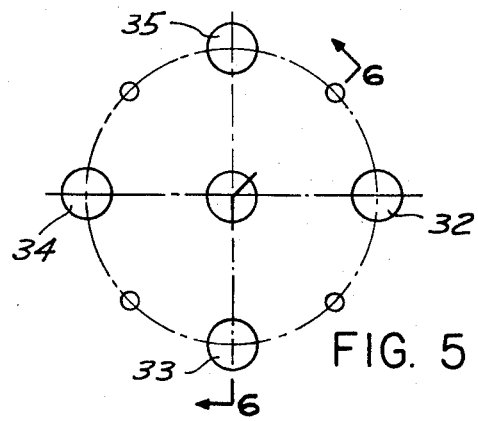
FIG. 5 is a schematic end elevation for a four position ice diverter valve.
Figure 8:
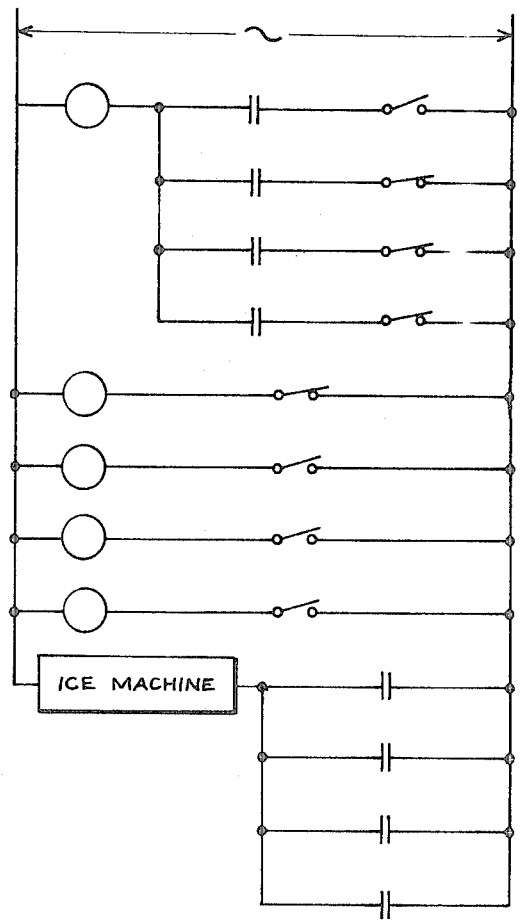
FIG. 8 is a schematic wiring diagram for a typical four-position installation.
Figure 6:
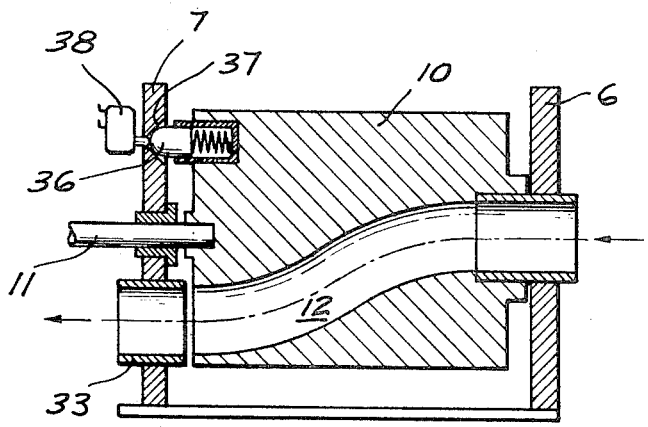
FIG. 6 is a longitudinal section taken along line 6-6 of FIG. 5 and shows the use of a spring loaded detent for obtaining correct registry of the outlet end of the valve duct with a selected ice outlet.

FIGS. 5 and 6 illustrated, somewhat schematically, a modification of the invention in which a multiplicity of remotely located storage bins may be supplied from a single icemaking machine, and FIG. 8 shows a typical wiring diagram for such an installation.

In this modification the end plate 7 is provided with four symmetrically arranged ice outlet tubes 32, 33, 34, 35 with which the outlet end of the valve duct 12 may be selectively registered. Accurate registry is assured by providing the associated end of the valve body 10 with a longitudinally projecting spring loaded detent 36 that is adapted to seat in a conical detent pocket 37 that is machined through the end plate 7. Four such detent pockets are provided and are angularly spaced the same as the axes of the outlet tubes 32—35. A limit switch 38 is associated with the opposite side of each detent pocket and is actuated by the end of the detent when it comes to rest in a selected pocket. A nonreversing motor (not shown) is used to drive the shaft 11 and rotate the valve body 10.

The wiring diagram of FIG. 8 is intended merely to be suggestive of a number of different control systems that could be employed and indicates a system for the manual control of the outlet selector switches with the outlet selector and limit switches as set when the valve duct 12 is registered with outlet 32.

It is of course to be understood that variations in arrangement and proportions of parts may be made within the scope of the appended claims.

I claim:

1. In a valve for diverting a flow of material from a single inlet to a selected one of at least two outlets spaced from said single inlet, a valve body rotatably supported intermediate said inlet and said outlets and provided with a longitudinally extending duct having an entrance end axially aligned with said single inlet and a discharge end radially offset from the axis of rotation of said valve body, said outlets being disposed along the locus of a circle whose radius is equal to the offset radius of the discharge end of said duct, means for rotating said valve body to register the discharge end of said duct with a selected one of said outlet, and means associated with the valve body and the outlets for preventing flow of the material through any nonselected outlets.

2. The diverter valve of claim 1 in which said valve body and said outlets are so arranged that material flowing through said duct and an outlet in registry therewith will be sheared as said valve body is rotated for registry of the discharge end of said duct with another of said outlets.

3. The diverter valve of claim 2 in which said valve body is a cylinder rotatable about its longitudinal axis and rotatably supported at one end of said single inlet and rotatably supported at its other end by an axially extending drive shaft, and in which said rotating means includes a radially extending toggle arm affixed to said drive shaft and adapted to contact said registration means, resilient biasing means extending from an outer position on said toggle arm to a fixed connection, power means for rotating said shaft to a position where said toggle arm passes dead center and for thereafter permitting said resilient biasing means to flip said toggle into contact with said registration means and effect accurate registration of the discharge end of said duct with an associated outlet.

4. The diverter valve of claim 3 in which the said power means for rotating said shaft comprises a reversible motor having a drive sprocket provided with an overrun hub, a driven sprocket affixed to said shaft and an endless sprocket chain connecting said drive and driven sprockets.

5. The diverter valve of claim 4 in which said single inlet is a tube extending through a first vertical supporting plate and in which said outlets are tubes extending through a second vertical supporting plate disposed in spaced parallel relation to said first supporting plate, the diameter of said duct and the inside diameters of said inlet and outlet tubes being equal.